Patented Oct. 30, 1923.

1,472,322

UNITED STATES PATENT OFFICE.

ERNST BECKMANN, OF BERLIN-DAHLEM, GERMANY, ASSIGNOR, BY MESNE ASSIGNMENTS, TO THE CHEMICAL FOUNDATION, INC., A CORPORATION OF DELAWARE.

PROCESS FOR PREPARING A FODDER FROM STRAW—E. G., OF CORN OR LEGUMES.

No Drawing.     Application filed May 10, 1919. Serial No. 296,206.

(GRANTED UNDER THE PROVISIONS OF THE ACT OF MARCH 3, 1921, 41 STAT. L., 1313.)

*To all whom it may concern:*

Be it known that I, ERNST BECKMANN, manager, a subject of the German Emperor, and residing at 63 Thielallee, Berlin-Dahlem, State of Prussia, have invented certain new and useful Improvements in or Relating to a Process for Preparing a Fodder from Straw—e. g., of Corn or Legumes—of which the following is a specification.

It has already been proposed to render straw, e. g. from corn or legumes, suitable as a fodder by wetting the same with a suitable lye and heating it so as to dissolve out the indigestible components of the straw, such as lignine, and eventually obtain a digestible product, which may be used as a fodder. The chief drawback of this process was that temperatures of 100° C. and higher were employed which necessitated a complicated plant. As only comparatively little liquid was employed the heating had to be carried out in a water bath, so as to prevent the material from burning and sticking to the vessel. For securing favourable results, it has also been attempted to carry out the heating in a steam chest at a pressure of 5—6 atmospheres.

For the reasons stated the process mentioned could not be performed on a small scale, because in such case the plant would not repay its cost, the process would in consequence of the too costly fuel required, be expensive, or because the necessary number of workers was not available. If on the other hand, the manufacture of this fodder were centralized, difficulties will arise in consequence of the high freight charges.

A further drawback of the process mentioned consists therein that when the lye acts on the straw, in the presence of heat or under pressure, and in particular, if strong lyes are used, not only the indigestible and injurious lignine, but also digestible substances such as xylane and the like will be dissolved from the straw and thus be lost as fodder.

It is the object of the present invention to obviate these drawbacks. This is obtained by omitting the step of raising the temperature or the pressure or both and subjecting the straw to a prolonged treatment with the lye. In carrying out the present invention lye is poured over straw, for example in form of chaff so that the entire mass of straw to be treated is covered. A too close compression will have a retarding effect. If now the straw is allowed to stand, for some time at the ordinary temperature of the air and at atmospheric pressure the straw will be gradually opened up in the desired manner, the lignine being first dissolved, while the xylane will be dissolved only to a small extent and will to its greater part, remain in the product. The degree of concentration of the lye may be varied, and with a lesser concentration the duration of the treatment may be lengthened. Good results are secured in using a lye of ½%. With a 3% lye acting on 8—9 times its weight of straw the opening up had, in 24 hours, proceeded so far, that the stalks and also the knots had become quite soft. A 2% lye required treatment for 36 hours, a 1% lye 48 hours to sufficiently soften the material. In a 0.5% lye the knots remain hard even after a protracted treatment. Nevertheless this lye will act on the straw and may be employed for a preparatory treatment. At the same time all alkali is consumed and an acid reaction will appear instead of the alkaline reaction.

For carrying out the process ordinary barrels, vats and other vessels may be used which, if made of wood are rendered proof against weak lyes by a coating of paraffin or other substances; preferably the vessels are made of clay, cement, iron and the like. These vessels are filled with straw chaff about 2 cm. long which is slightly compressed, for example by placing a perforated disk upon it; lye of the desired concentration is prepared in a separate vessel and thereupon poured over the chaff until the latter is completely covered with lye. Then the vessel is closed with a well fitting cover, so as to reduce the absorption of carbonic acid and oxygen from the atmosphere. After the process has been completed, the chaff is washed with water, so as to remove all remaining alkali, which might be injurious to the animal. This is preferably performed by placing a sheet of filtering paper or the like on top of the chaff, and water is poured on while the lye is allowed to slowly run off at the bottom. Lyes of different concentrations may also be employed successively, or fresh lye may be added after an used lye has been made to act upon the straw. This will accelerate the process. The duration of the treatment is best determined by the softening of the knots; this may be done by enclosing some pieces of knots in a wire tube and placing the latter in such a manner into the straw that it may easily be withdrawn for examination. It is not necessary to dry the product, if, when made by the farmer himself, it is to be immediately used when finished. The freshly prepared product has at first a citron-yellow colour, which will gradually pale down. If it is left for some time in a moist condition it will begin to mould. If therefore it is intended to be stored for a longer period, it is better to filter-press it, pack it in silos, or to dry it.

For carrying out the process, either soda or potash lye may be used.

It is obvious that the process may be performed by any small farmer without any special plant and that therefore the preparation of the fodder is very cheap, the straw being at the same time utilized to a higher degree than by any other process heretofore disclosed.

I claim—

1. The herein described process of preparing fodder from straw, which consists in treating the straw in chopped condition with a solution of lye containing 1 to 3 per cent alkali at ordinary temperature for a period of time depending upon the degree of concentration of the lye, to gradually open up the straw and dissolve its indigestible constituents; and then washing the straw with water to remove the lye and the substances dissolved therein.

2. The herein described process of preparing fodder from straw, which consists in treating the straw in chopped condition with a solution of lye containing 1 to 3 per cent alkali at ordinary temperature for 24 to 48 hours, to gradually open up the straw and dissolve its indigestible constituents; washing the straw with water to remove the lye and the substances dissolved therein; and thereafter drying and pressing the straw.

3. The herein described process of preparing fodder from straw which consists in placing the straw in a subdivided state in a receptacle, pouring therein, covering the entire mass, a solution of an alkali containing 1% to 3% alkali, allowing the mixture to stand at ordinary temperature and pressure until the knots become soft, and finally washing.

4. The herein described process of preparing fodder from straw which consists in placing the straw in a subdivided state in a receptacle, pouring therein, covering the entire mass, a solution of soda lye containing 1% to 3% alkali, allowing the mixture to stand at ordinary temperature and pressure until the knots become soft, and finally washing.

In testimony whereof I have affixed my signature in presence of two witnesses.

PROF. DR. ERNST BECKMANN.

Witnesses:
 BRUNO BROCK,
 M. BLUMENREICH.